United States Patent
Cramer et al.

(10) Patent No.: US 6,283,645 B1
(45) Date of Patent: Sep. 4, 2001

(54) CAMERA WITH FILM DEBRIS CATCHING COMB

(75) Inventors: Michael P. Cramer, Victor; James D. Boyd, Rochester; Stephen J. Smith, Shortsville, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/491,507

(22) Filed: Jan. 26, 2000

(51) Int. Cl.[7] ................................... G03B 17/00
(52) U.S. Cl. ................. 396/415; 396/6; 396/535; 352/130; 355/30; 15/100
(58) Field of Search ............... 396/6, 415, 535, 396/538; 352/130, 228; 355/30; 15/21.1, 100

(56) References Cited

U.S. PATENT DOCUMENTS

| | | | |
|---|---|---|---|
| Re. 35,856 | * | 7/1998 | Pearson .................. 396/440 |
| 579,949 | * | 4/1897 | Brownell ................. 396/385 |
| 1,314,523 | | 9/1919 | Kroedel . |
| 2,351,371 | * | 6/1944 | Smith .................... 355/30 |
| 3,384,318 | | 5/1968 | Nerwin et al. . |
| 5,142,316 | | 8/1992 | Tanii et al. . |
| 5,546,148 | | 8/1996 | Janson, Jr. . |
| 5,585,876 | | 12/1996 | Kobayashi . |
| 5,604,557 | | 2/1997 | Kobayashi et al. . |
| 5,841,516 | * | 11/1998 | Miyawaki et al. ........ 355/30 |

* cited by examiner

Primary Examiner—Russell Adams
Assistant Examiner—Kenneth J. Whittington
(74) Attorney, Agent, or Firm—Roger A. Fields

(57) ABSTRACT

A camera has a rear backframe (exposure) opening, including a pair of spaced opposite ends across which successive sections of a filmstrip are moved for each section of the filmstrip to be advanced over the backframe opening. A pair of parallel film rails have longitudinal film support surfaces that support each section of the filmstrip over the backframe opening. A pair of parallel film debris catching combs are positioned between the film rails, proximate respective ones of the opposite ends of the backframe opening, and inwardly of the longitudinal film support surfaces to remove any debris from each section of the filmstrip before that section is advanced over the backframe opening. One of the film debris catching combs preferably is positioned inwardly of the film support surfaces farther than the other comb.

5 Claims, 6 Drawing Sheets

CAMERA WITH FILM DEBRIS CATCHING COMB

FIELD OF THE INVENTION

The invention relates generally to the field of photography, and in particular to cameras. More specifically, the invention relates to a camera with a film debris catching comb.

BACKGROUND OF THE INVENTION

Film and cameras that are all in one, commonly referred to as single-use or one-time-use cameras, have become well known. The one-time-use camera is a simple point-and-shoot type comprising an opaque plastic main body part that supports a conventional film cartridge in a cartridge receiving chamber, an unexposed filmstrip substantially prewound from the film cartridge onto a film spool in a film supply chamber to form an unexposed film roll, a fixed-focus taking lens, a film metering mechanism with a rotatably supported metering sprocket that engages the filmstrip, a manually rotatable film winding thumbwheel coaxially engaged with a film spool inside the film cartridge, a single-blade shutter for exposing successive sections of the filmstrip, a manually depressible shutter release button, a rotatable frame counter for indicating the number of exposures remaining to be made on the filmstrip, a direct see-through viewfinder having front and rear viewfinder lenses, and in some models an electronic flash unit. A pair of opaque plastic front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip from a rear backframe (exposure) opening in the main body part into the film cartridge, and advances an unexposed section of the filmstrip from the unexposed film roll to the backframe opening. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel. When the metering lever engages the thumbwheel, further rotation of the thumbwheel is prevented. Manually depressing the shutter release button to take another picture pivots the metering lever out of engagement with the thumbwheel to permit renewed rotation of the thumbwheel. After the maximum number of exposures available on the filmstrip have been made, and the filmstrip is completely wound into the film cartridge, the one-time-use camera is given to a photofinisher who separates the rear cover part from the main body part and removes the film cartridge with the exposed filmstrip from the cartridge receiving chamber. Then, he removes the exposed filmstrip from the film cartridge to develop the negatives and make prints for the customer. Most of the used parts such as the electronic flash unit can be recycled, i.e. reused, to remanufacture the one-time-use camera.

Prior Art Problem

During original or remanufacture of the one-time-use camera, the filmstrip is prewound continuously from the film cartridge in the cartridge receiving chamber and over the backframe opening to form the unexposed film roll on the film spool in the film supply chamber. Conversely, after each picture is taken, the filmstrip is advanced incrementally in an opposite direction from the unexposed film roll on the film spool in the film supply chamber, over the backframe opening, and into the film cartridge in the cartridge receiving chamber. In each instance, debris originally on the filmstrip or picked up in the camera may fall off the filmstrip and into the backframe opening. The debris which has fallen into the backframe opening may partially occlude each section of the filmstrip at the backframe opening during picture-taking.

SUMMARY OF THE INVENTION

According to the invention, a camera comprising a backframe opening over which successive sections of a filmstrip are moved to be exposed, and a pair of parallel film rails having longitudinal film support surfaces that support each section of the filmstrip over the backframe opening, is characterized in that:

a film debris catching comb is positioned between the film rails, proximate the backframe opening, and inwardly of the longitudinal film support surfaces to remove any debris from each section of the filmstrip before that section is moved over the backframe opening to be exposed.

More specifically, a camera comprising a backframe opening with a pair of spaced opposite ends across which successive sections of a filmstrip are moved for each section of the filmstrip to be advanced over the backframe opening, and a pair of parallel film rails having longitudinal film support surfaces that support each section of the filmstrip over the backframe opening, is characterized in that:

a pair of parallel film debris catching combs are positioned between the film rails, proximate respective ones of the opposite ends of the backframe opening, and inwardly of the longitudinal film support surfaces to remove any debris from each section of the filmstrip before that section is advanced over the backframe opening; and one of the film debris catching combs is positioned inwardly of the film support surfaces farther than the other comb.

DETAILED DESCRIPTION OF THE INVENTION

The invention is disclosed as being embodied preferably in a onetime-use camera. Because the features of a onetime-use camera are generally known, the description which follows is directed in particular only to those elements forming part of or cooperating directly with the disclosed embodiment. It is to be understood, however, that other elements may take various forms known to a person of ordinary skill in the art.

Figure 1:
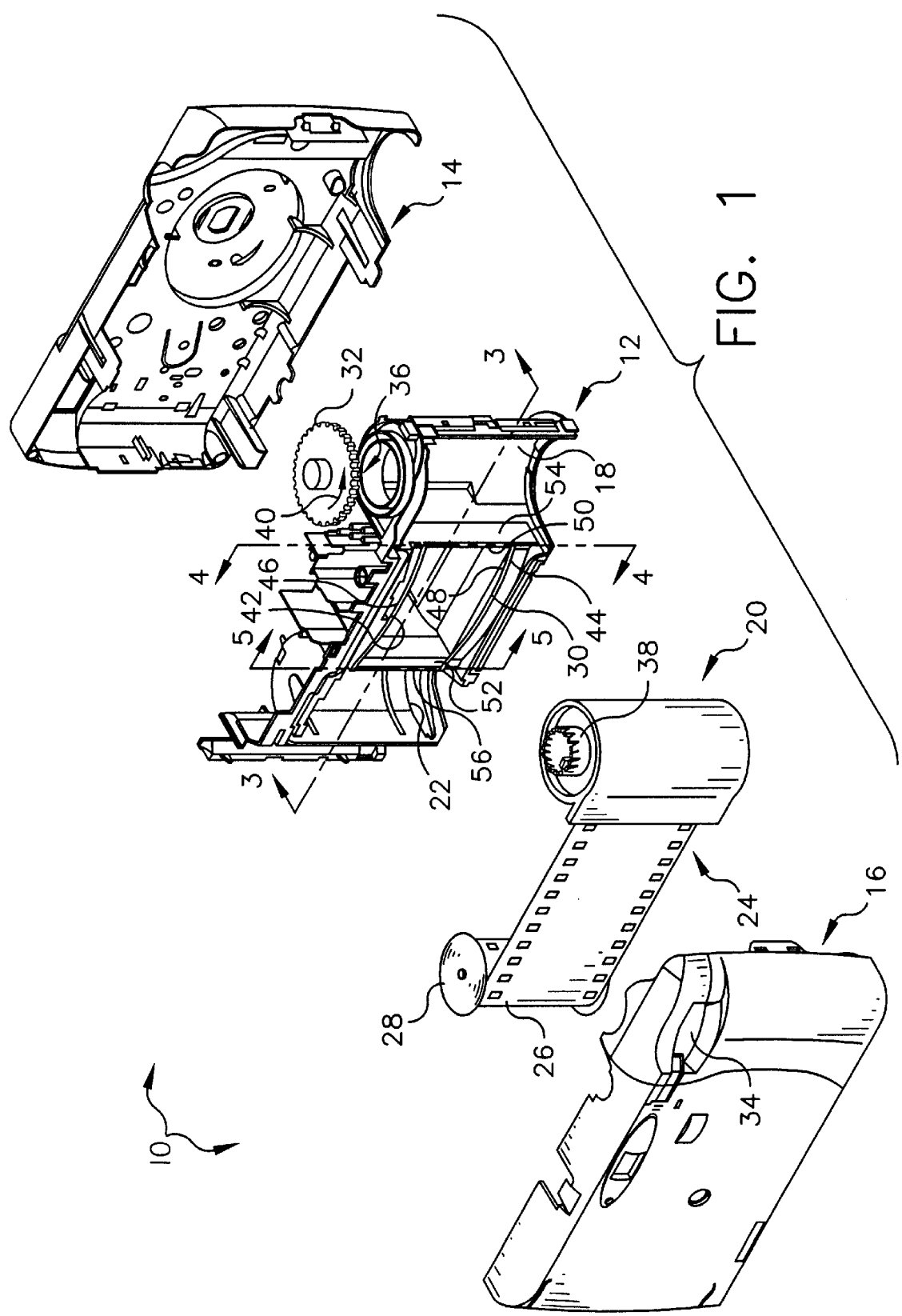
FIG. 1 is an exploded rear perspective view of a camera with film debris catching combs, which is a preferred embodiment of the invention.

Referring now to the drawings, FIG. 1 shows a one-time-use camera 10. The one-time-use camera 10 includes a plastic opaque main body part 12, a plastic opaque front cover part 14, and a plastic opaque rear cover part 16. The front cover part 14 and the rear cover part 16 house the main body part 12 between them and are connected releasably to one another and to the main body part 12 via known flexible hook-in-hole connections.

Figure 3:
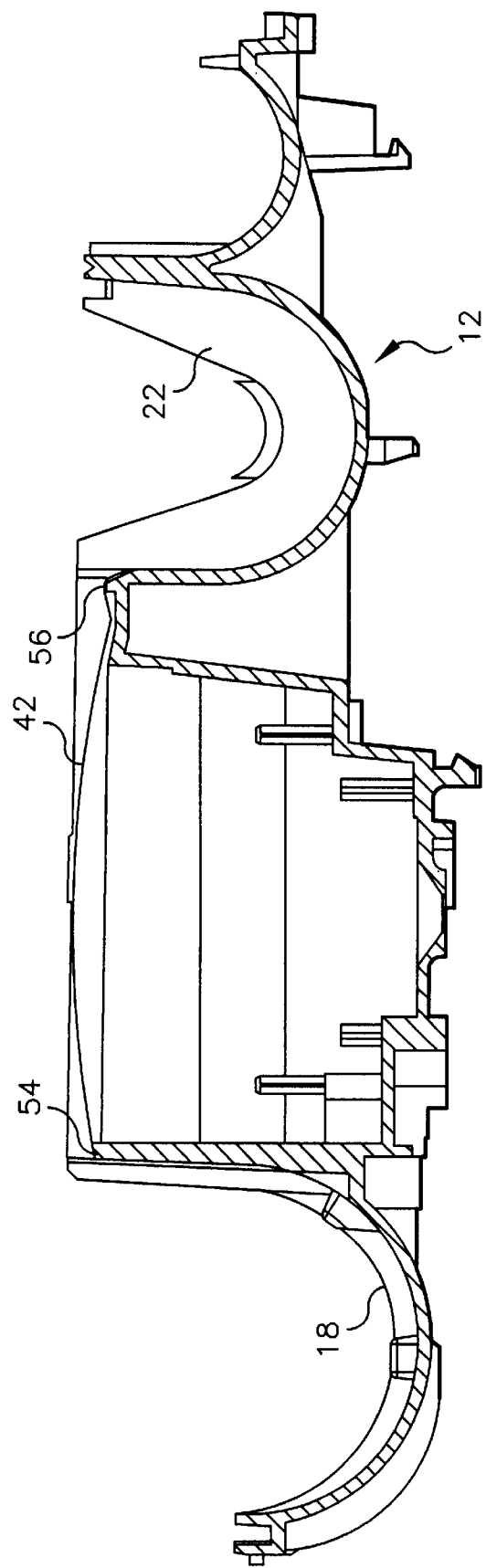
FIG. 3 is a cross-section view of the main body part as seen in the direction of the arrows 3, 3 in FIG. 1.
Figure 4:
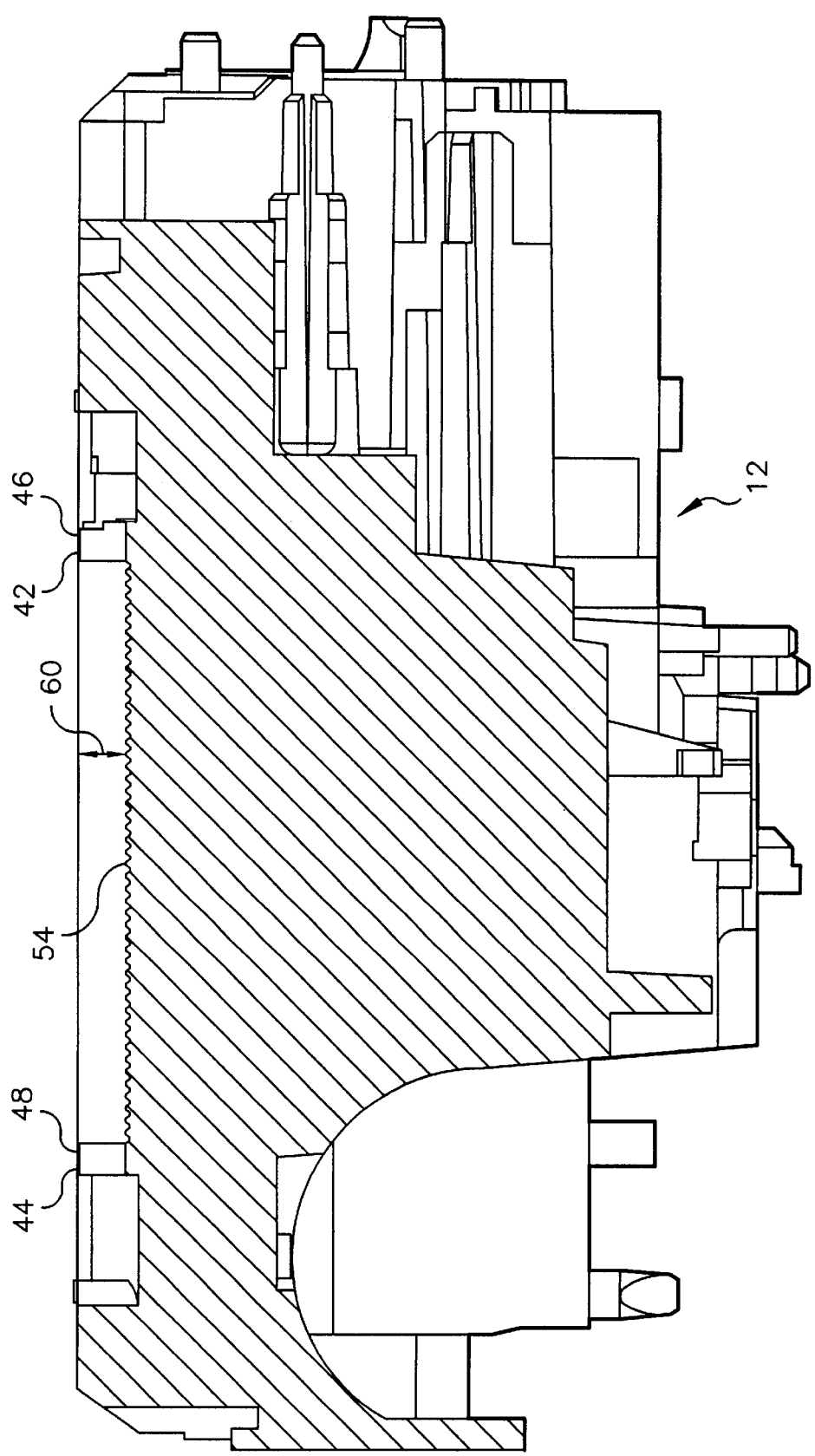
FIG. 4 is a cross-section view of the main body part as seen in the direction of the arrows 4, 4 in FIG. 1.
Figure 5:
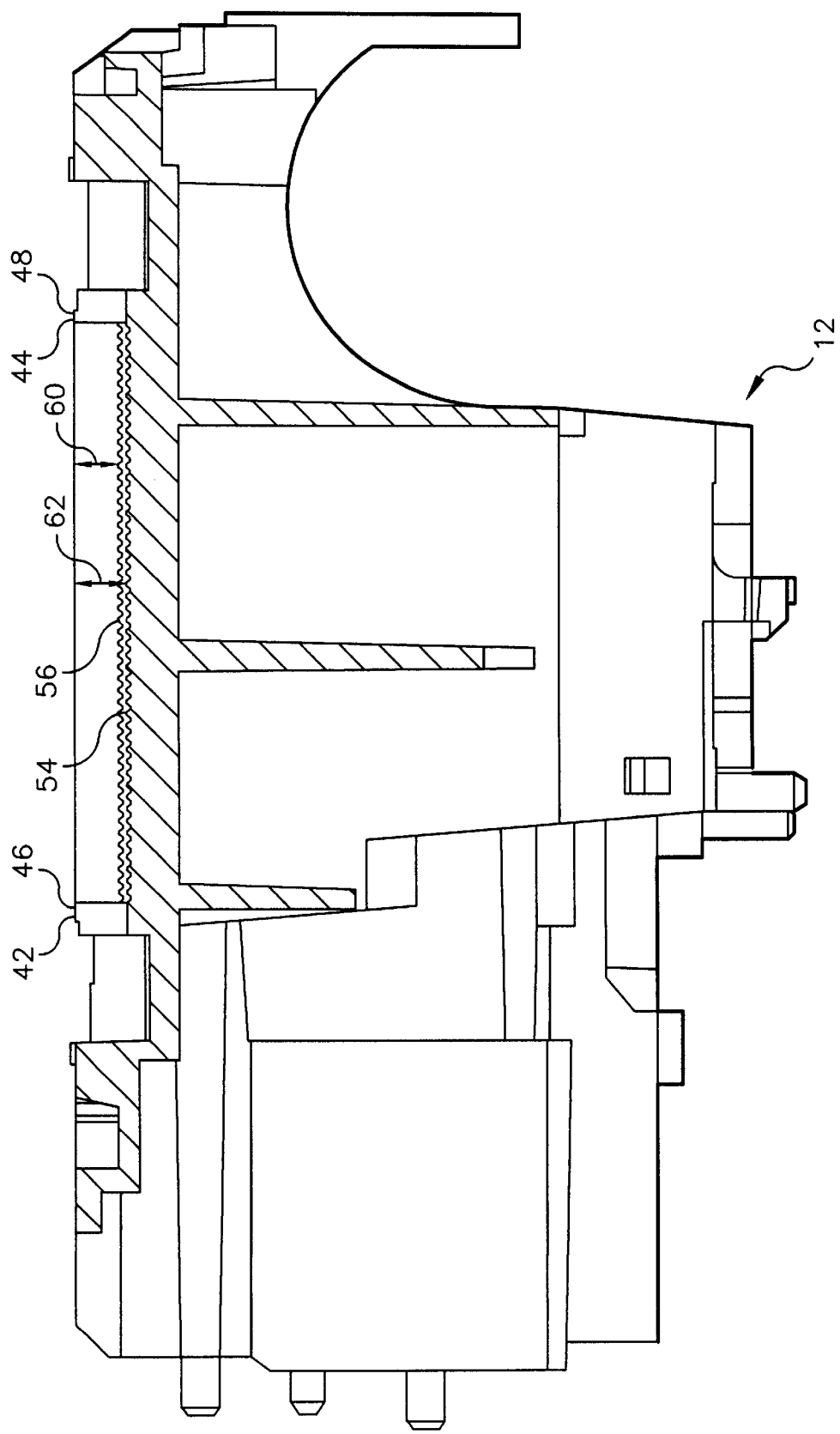
FIG. 5 is a cross-section view of the main body part as seen in the direction of the arrows 5, 5 in FIG. 1.

As is typical, the main body part 12 has a rearwardly open cartridge receiving chamber 18 for a conventional film cartridge 20 and a rearwardly open film supply chamber 22 for an unexposed filmstrip 24. See FIG. 1. The unexposed filmstrip 24, except for a trailing end portion (not shown) in the film cartridge, is wound into an unexposed film roll 26 on a rotatable film spool 28 in the film supply chamber. A rearwardly open, rectangular-shaped backframe (exposure) opening 30 is located intermediate the cartridge receiving chamber 18 and the film supply chamber 22 for exposing successive sections of the filmstrip 24 when ambient light is received through a front taking lens (not shown) on the main body part 12. See FIGS. 1 and 3.

A manual film winder or film winding thumbwheel 32, rotatably supported on the main body part 12, above the cartridge receiving chamber 18, radially protrudes partially from an elongate narrow opening 34 in the rear cover part 16 and has a depending coaxial stem 36 in coaxial engagement with an exposed top end 38 of a film take-up spool inside the film cartridge 20. The film winding thumbwheel 32 is manually grasped or fingered to rotate the thumbwheel in a film winding direction 40, i.e. counter-clockwise in FIG. 1, to similarly rotate the film take-up spool inside the film cartridge 20. This is done in order to wind an exposed section of the filmstrip 24 from the backframe opening 30 into the film cartridge 20 and to move a fresh unexposed section of the filmstrip from the unexposed film roll 26 to the backframe opening.

Figure 2:
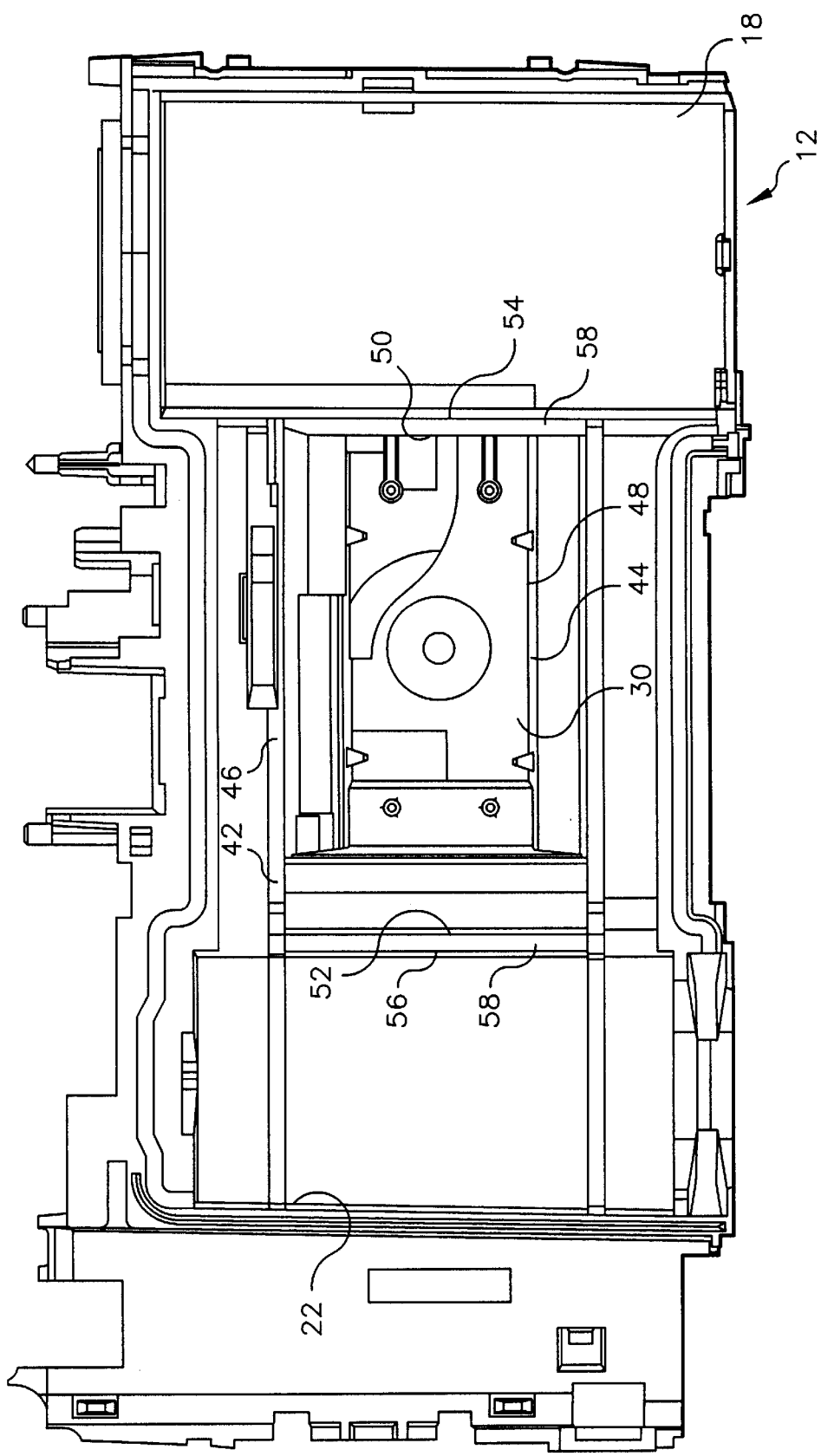
FIG. 2 is a rear elevation view of a main body part of the camera that integrally includes the film debris catching combs.

As shown in FIGS. 1 and 2, the main body part 12 has an integral pair of parallel film rails 42 and 44 with arched longitudinal film support surfaces 46 and 48 that support each section of the filmstrip 24 over the backframe opening 30. The backframe opening 30 has a pair of parallel ends (sides) 50 and 52 that longitudinally extend between (perpendicular to) the film rails 42 and 44.

Figure 6:
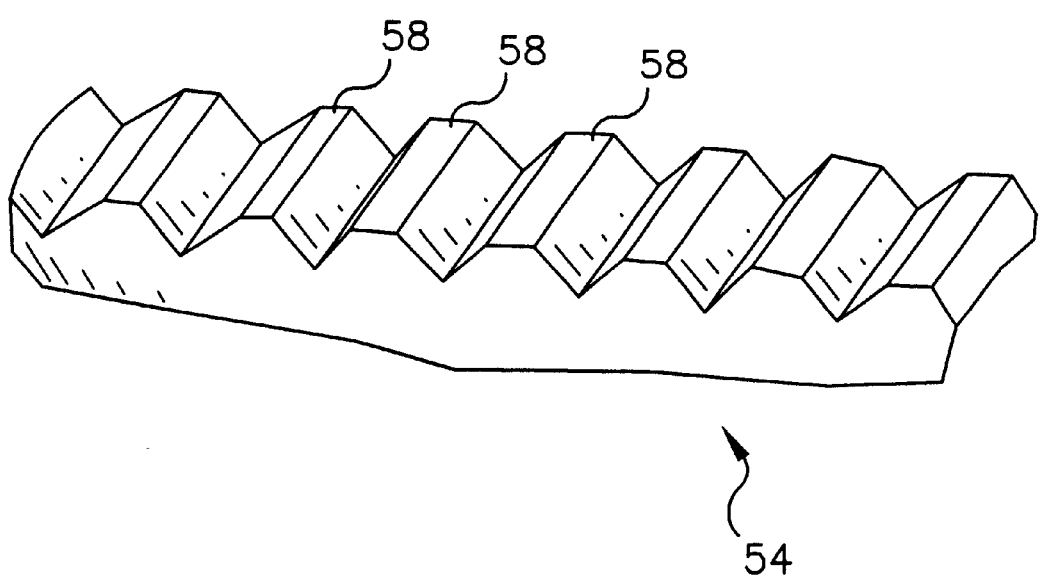
FIG. 6 is an enlarged perspective view of one of the film debris catching combs.

A pair of parallel film debris catching film combs 54 and 56, which are integral with the main body part 12, are positioned between (perpendicular to) the film rails 42 and 44, proximate (nearby) respective ones of the ends 50 and 52 of the backframe opening 30, and inwardly of the longitudinal film support surfaces 46 and 48. This is shown in FIGS. 1, 2, 4 and 5. What is meant by "inwardly" is clearly illustrated in FIG. 5, which depicts the film debris catching combs 54 and 56 below or recessed from the longitudinal film supporting surfaces 46 and 48. Each of the film debris catching combs 54 and 56 has a plurality of identical, evenly pitched, rigid inflexible teeth 58, shown in FIG. 6. One of the film debris catching combs 54 is positioned inwardly of the longitudinal film support surfaces 46 and 48 farther than the other comb 56 is positioned inwardly of the longitudinal film support surfaces (although the two combs could be positioned inwardly the same distance). See FIG. 5. Preferably, the film debris catching comb 54 is positioned inwardly of the longitudinal film support surfaces 46 and 48 a first distance 60 which is 0.004 inches and the other comb 56 is positioned inwardly of the longitudinal film support surfaces a second distance 62 which is 0.005 inches. These distances, obviously, can vary, but a good range is 0.008 inches–0.002 inches.

Operation

During original or remanufacture of the one-time-use camera 10, a motorized auxiliary film winder (not shown) is rotationally engaged with the film spool 28 in the film supply chamber 22 to prewind the filmstrip 24 continuously from the film cartridge 20 in the cartridge receiving chamber 18 and over the backframe opening 30 to form the unexposed film roll 26 on the film spool. At this time, the film debris catching comb 54 removes any original debris that may be on the filmstrip 24 from each section of the filmstrip before that section is moved over the backframe opening 30. The debris which has been removed from the filmstrip 24 falls into the cartridge receiving chamber 18. No debris falls into the backframe opening 30. This film prewinding operation can be done in a darkroom with the rear cover part 16 removed from the main body part 12.

Conversely, after each picture is taken, the film winding thumbwheel 32 is manually rotated in the film winding direction 40, i.e. counterclockwise in FIG. 1, to similarly rotate the film take-up spool inside the film cartridge 20. The filmstrip 24 then is advanced incrementally from the unexposed film roll 26 on the film spool 28 in the film supply chamber 22, over the backframe opening 30, and into the film cartridge 20 in the cartridge receiving chamber 18. In this instance, the film debris comb 56 removes any debris that the filmstrip 24 may have picked up in the film supply chamber 22 from each section of the filmstrip before that section is moved over the backframe opening. The debris which has been removed from the filmstrip 24 falls into the film supply chamber 22. No debris falls into the backframe opening 30.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. front cover part
16. rear cover part
18. cartridge receiving chamber
20. film cartridge
22. film supply chamber
24. filmstrip
26. unexposed film roll
28. film spool
30. backframe (exposure) opening
32. film winding thumbwheel
34. elongate narrow opening
36. coaxial stem
38. exposed spool end
40. film winding direction
42. film rail
44. film rail
46. film supporting surface
48. film supporting surface 50. opening end
52. opening end
54. film debris catching comb
56. film debris catching comb
58. teeth
60. first distance
62. second distance

What is claimed is:

1. A camera comprising a backframe opening over which successive sections of a filmstrip are moved to be exposed, and a pair of parallel film rails having longitudinal film support surfaces that support each section of the filmstrip over said backframe opening, is characterized in that:

a film debris catching comb is positioned between said film rails, proximate said backframe opening, and inwardly of said longitudinal film support surfaces to remove any debris from each section of the filmstrip before that section is moved over said backframe opening to be exposed.

2. A camera as recited in claim 1, wherein said film debris catching comb has a plurality of rigid inflexible teeth.

3. A camera as recited in claim 1, wherein said film debris catching comb is positioned inwardly of said longitudinal film support surfaces a distance within the range of 0.008 inches–0.002 inches.

4. A camera comprising a backframe opening with a pair of spaced opposite ends across which successive sections of a filmstrip are moved for each section of the filmstrip to be advanced over said backframe opening, and a pair of parallel film rails having longitudinal film support surfaces that support each section of the filmstrip over said backframe opening, is characterized in that:

a pair of parallel film debris catching combs are positioned between said film rails, proximate respective ones of said opposite ends of the backframe opening, and inwardly of said longitudinal film support surfaces to remove any debris from each section of the filmstrip before that section is advanced over said backframe opening; and one of said film debris catching combs is positioned inwardly of said film support surfaces farther than the other comb.

5. A camera as recited in claim 4, wherein one of said film debris catching combs is positioned inwardly of said film support surfaces 0.004 inches and the other comb is positioned inwardly of said film support surfaces 0.005 inches.

* * * * *